United States Patent
Liege et al.

(10) Patent No.: US 8,270,083 B2
(45) Date of Patent: Sep. 18, 2012

(54) OPTICAL SYSTEM FURNISHED WITH A DEVICE FOR INCREASING ITS DEPTH OF FIELD

(75) Inventors: Bruno Liege, Boulogne (FR); Regis Tessieres, Paris (FR); Frederic Guichard, Paris (FR); Etienne Knauer, Boulogne (FR); Hoang-Phi Nguyen, Paris (FR)

(73) Assignee: DXO Labs, Boulogne Billancourt (FR)

( * ) Notice: Subject to any disclaimer, the term of this patent is extended or adjusted under 35 U.S.C. 154(b) by 204 days.

(21) Appl. No.: 12/672,018

(22) PCT Filed: Jul. 7, 2008

(86) PCT No.: PCT/FR2008/051265
§ 371 (c)(1),
(2), (4) Date: May 28, 2010

(87) PCT Pub. No.: WO2009/019362
PCT Pub. Date: Feb. 12, 2009

(65) Prior Publication Data
US 2011/0026909 A1    Feb. 3, 2011

(30) Foreign Application Priority Data

Aug. 3, 2007   (FR) .................................. 07 56948

(51) Int. Cl.
*G02B 27/00* (2006.01)
(52) U.S. Cl. ........................................................ 359/618
(58) Field of Classification Search .................. 359/558, 359/618
See application file for complete search history.

(56) References Cited

U.S. PATENT DOCUMENTS 5,748,371 A * 5/1998 Cathey et al. ................. 359/558
2006/0171041 A1   8/2006 Olmstead

FOREIGN PATENT DOCUMENTS

EP       0 157 476 A     10/1985
FR       2880958 A1      7/2006

* cited by examiner

*Primary Examiner* — James Jones
(74) *Attorney, Agent, or Firm* — Im IP Law PLLC; C. Andrew Im (57) ABSTRACT

To increase the depth of field of an optical system, an inversion of the chromatism is produced. This accommodates the fact that, in natural light, users prefer, for their photographs, taking long distance shots outdoors, where the illuminant is mostly composed of blue, and short-distance shots indoors, where the illuminant is mostly composed of red. While optical devices naturally focus the blue components at a shorter distance than the red components, which is unfavorable, with an inversion of the chromatism, a focus more in keeping with what is required is restored.

13 Claims, 8 Drawing Sheets

OPTICAL SYSTEM FURNISHED WITH A DEVICE FOR INCREASING ITS DEPTH OF FIELD

RELATED APPLICATIONS

This application is a §371 application from PCT/FR2008/051265 filed Jul. 7, 2008, which claims priority from French Patent Application No. 07 56948 filed Aug. 3, 2007, each of which is herein incorporated by reference in its entirety.

TECHNICAL FIELD OF THE INVENTION

The subject of the invention is a device for increasing the depth of field of an optical system. Its object is to increase the depth of field of an optical system beyond its conventional limits.

BACKGROUND OF THE INVENTION

According to some nonlimiting examples, the optical system can be incorporated into an image acquisition system, which may be a disposable camera, a digital camera, a reflex camera (digital or non-digital), a scanner, a fax machine, an endoscope, a motion picture camera, a video camera, a surveillance camera, a toy, a camcorder or camera incorporated into or connected to a telephone, personal digital assistant or computer, a thermal camera, un ultrasound device, an MRI (magnetic resonance) imaging device, or an X-ray radiography device.

An image acquisition system generally comprises, in addition to an optical system whose role is to focus light, a sensor. Such a sensor comprises mechanical, chemical or electronic means for capturing and/or recording images.

The sensor is, for example, a system of photosensitive cells that transforms the quantity of light received into numerical values, and that assigns to each pixel the value or values that correspond to it. The unprocessed image acquired directly by the sensor is traditionally called the RAW image. The number of numerical values ultimately assigned to each pixel depends on the image capturing system.

OBJECTS AND SUMMARY OF THE INVENTION

In a variant of embodiment, a numerical value is associated with a measurement by the sensor in each spectral band as defined according to the invention. The numerical values thus obtained are stored using storage means.

Preferably, according to the invention, processing means connected to the storage means process the stored data. What is meant by digital image processing means is, for example, a piece of software and/or a component and/or a piece of equipment and/or a system for modifying the quality of the image.

The digital image processing means can take many forms depending on the application.

The digital image processing means can be incorporated, in whole or in part, into the device, as in the following examples:
An image capturing device that produces modified images, for example a digital camera that incorporates image processing means.
A professional image capturing device that produces modified images, for example an endoscope that includes image processing means.
The digital image processing means can be incorporated, in whole or in part, into a computer. In that case, in practice the image processing means are compatible with multiple devices.

The optical system can have a fixed or variable focal length, a fixed or variable aperture, and a fixed or variable focus.

Figure 1A:
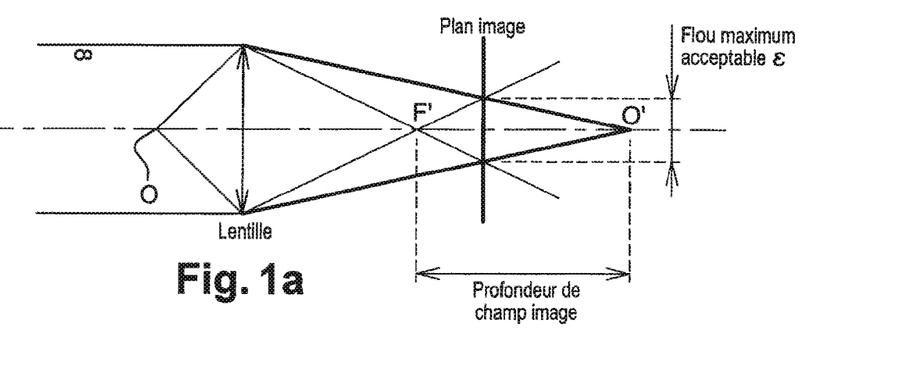

In the case of a conventional optical system with a fixed focal length, FIG. 1a, the depth of field can for example be determined by the maximum acceptable size of the polychromatic image spot of an object point O in the image plane. This is particularly the case in the context of photography. In the case of a monochromatic incident wave and a perfect optical system, this maximum size is represented by the maximum acceptable blur, designated by $\epsilon$ in FIG. 1a. In order to have an image that is sharp at infinity and at the shortest possible distance, it is necessary to place the image sensor in an image plane, in the position represented in FIG. 1a. This position corresponds to the intersection of the marginal rays coming from infinity and from the near distance defined by the object point O. In this special position, the blur spot for an object at infinity is of a size identical to that obtained for an object placed at O.

The image depth of field corresponds to the distance F'O', where F' is the focal point of the lens and O' is the image of O through the lens.

The object depth of field corresponds to the distance between the two extreme objects, in this case infinity and O. Given that, in this specific case, infinity will be sharp, it is generally more advantageous to look at the minimum distance (the object placed at O) for which the image will be sharp. The lower the value $\epsilon$, the farther the point O must be from the lens, and the smaller the depth of field.

A minimum distance $d_{minimum}$ for a conventional defect-free optical system is determined by the following formula in the context of an image sensor in the 4/3 format:

$$d_{minimum} = \frac{1}{2} \left( \frac{25 \cdot NMpixels \cdot 10^6 \cdot P}{96 \cdot \sqrt{2} \cdot \tan^2\left(\frac{FOV}{2}\right) \cdot f/\#} - \frac{5 \cdot \sqrt{NMpixels \cdot 10^6 \cdot P}}{4\sqrt{3} \cdot \tan\left(\frac{FOV}{2}\right)} \right)$$

where NMpixels corresponds to the number of millions of pixels of the image sensor, P to the pixel size, FOV to the angle of view perceived by the lens and f/# to the aperture number of the lens.

Given the following parameters—f/#=2.8, FOV=65°, NMpixels=3 and P=2.8 µm—the minimum distance will be equal to 56 cm. This distance is to be compared with the 10 cm attainable with the present invention.

The above reasoning can be extended to the case of a zoom lens, which represents an optical system whose focal length is variable, or to a system for projecting images onto a screen, for example wall-mounted, the screen playing the role of the image plane (or conversely, playing the role of an object, when conventionally considering an inversion of the optical phenomenon, which is reversible).

Furthermore, many existing photographic devices are equipped with a so-called Auto Focus function, which corresponds to an automatic focusing function. This focusing function is based on an image of a natural scene, seeking to obtain the best possible sharpness for that image. The principle of this function is that it seeks to position itself at the sharpest point for that image.

In the prior art, particularly in the devices developed by the Company DXO LABS, this depth of field can be extended by using longitudinal chromatic aberration and by subsequently processing the image obtained by means of the image sensor, as described in the document FR-A-2 880 958. In essence, a depth of field's sharpness range, the range in which the size of the image spot is below a predetermined threshold, is not the same depending on the color, the chromatic component of the light signal from the object to be captured in the image plane. It is thus possible to distinguish several sharpness ranges, for example three ranges, in accordance with the spectral components in question, for example, red, green and blue. It is therefore possible to arrange to have at least one sharp color per given distance range and to transfer the sharpness of the sharpest channel to the other two color channels.

Figure 2:
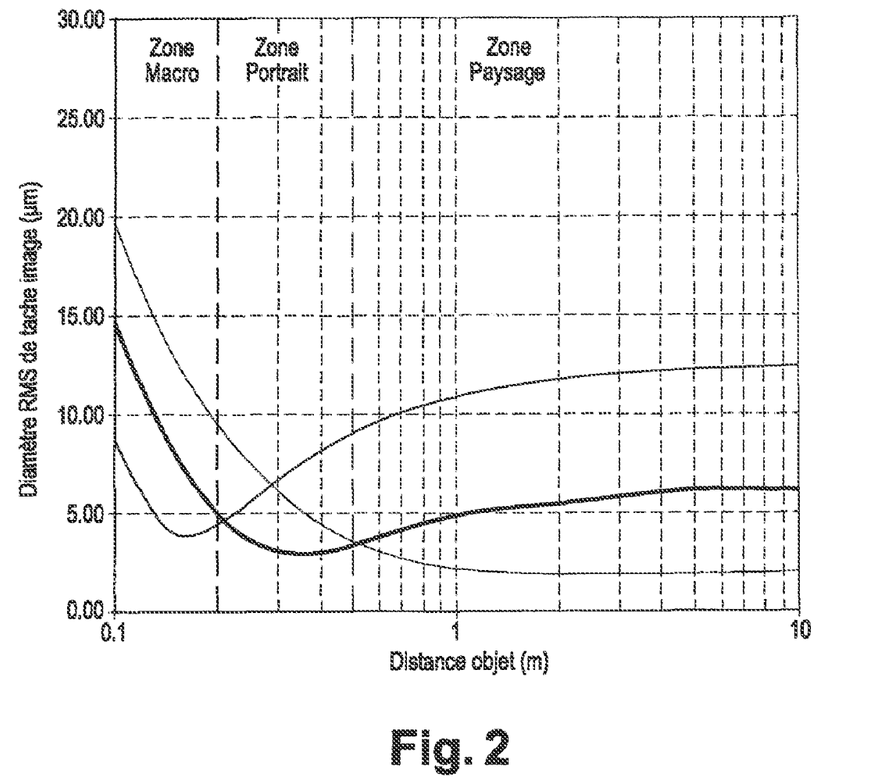
FIG. 2: already discussed, a representation of the variance of the image spot as a function of the object distance for three channels, red, green and blue.

In the example of FIG. 2, the variance of the image spot, on the ordinate, is represented as a function of the object distance, on the abscissa, and as a function of the spectral component. The curve having the highest ordinate at the origin is the curve of the red spectral component (wavelengths of between 600 nm and 700 nm). The intermediate curve is that of the green component (wavelengths of between 500 nm and 600 nm), and the curve having the lowest ordinate at the origin is that of the blue component (wavelengths of between 400 nm and 500 nm). It is therefore possible to divide the object distances into three zones. It is possible to define a so-called macro zone, for objects from 10 cm to 20 cm away from the optical system, in which the blue will be sharper than the green or the red. A portrait zone between 20 cm and 50 cm is the one in which the green will be sharper than the blue and the red. A landscape zone beyond 50 cm is the one in which the red will be sharper than the blue and the green. It would also be possible to define more (or fewer) zones and more (or fewer) color ranges.

Without any processing of the image after its capture, such an optical system produces a blurred image because of the chromatic aberration present. With a digital processing that makes it possible to transfer the sharpness of the sharpest channel to the other channels, it is possible to obtain a sharp image over a greater distance range, in practice from 10 cm to infinity.

The chromatic aberration introduced into the optical system is controlled in order to obtain the desired depth of field.

The chromatic aberration present in the system being known, the digital correction of the image after its capture is performed in accordance with various distance ranges. In essence, depending on the value of the image spot for the three color channels, the distance between the object and the lens is evaluated and the digital correction of the image is adapted based on the distance found. The digital processing of the image is adaptive with respect to the object distance and therefore it is not necessary to have an image spot that is invariant with respect to the object distance.

Naturally, when the constraints on the optical system are relaxed in order to allow longitudinal chromatic aberration, it is observed that the blue is sharper in the macro zone and that the red is sharper in the landscape zone.

Figure 1B:
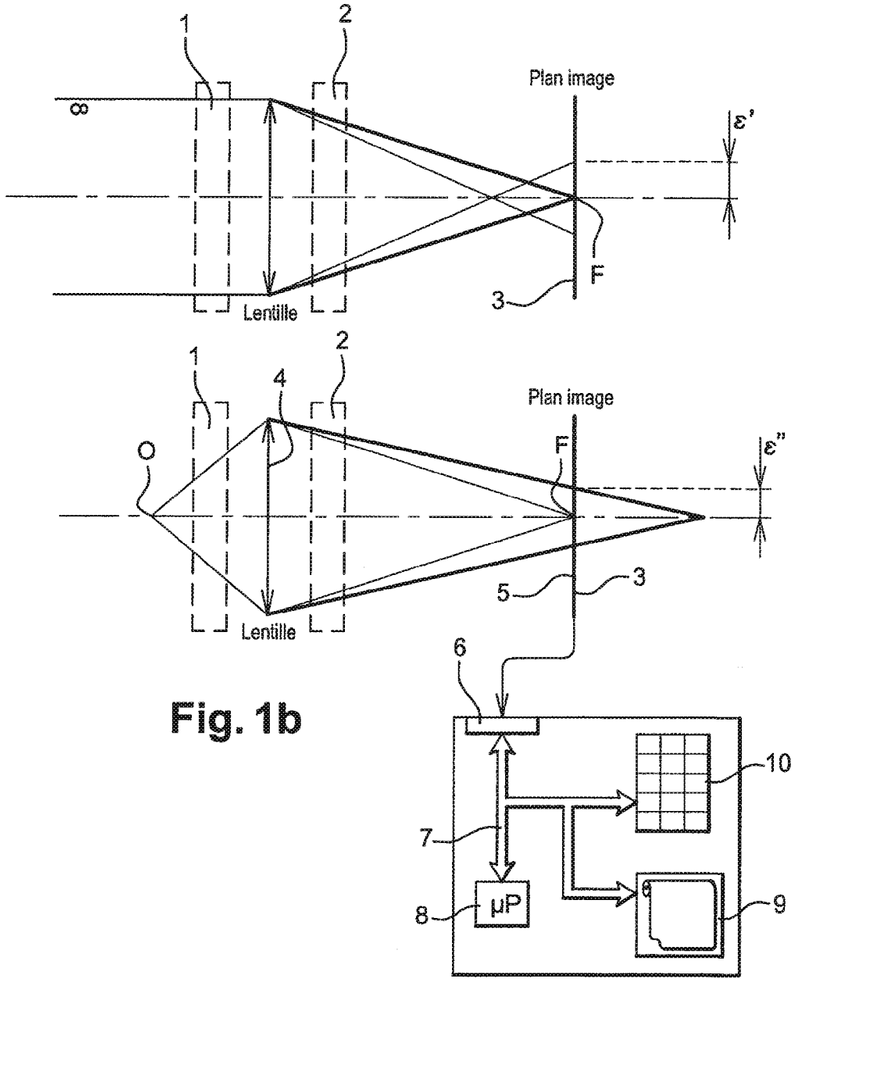

This results from the fact that blue generally focuses in front of red. In fact, given an optical system composed of a lens and a fixed image plane in which the image sensor will be placed, when the object is placed at infinity it is the red that will be sharp, and when the object is placed at a finite distance, the rays will shift equally to the right and it is the blue that will be sharpest. This is illustrated in FIG. 1b, where for the upper part, the red rays are focused on the focal point F, while the blue rays, which are focused in front of the focal point F, allow a spot of height $\epsilon'$ to appear in the image plane.

What is meant by blue is incoherent light composed of short visible wavelengths, and what is meant by red is incoherent light composed of long visible wavelengths.

Reference is also made to the color temperature, which makes it possible to determine the color of a light source. It is measured in kelvins. The color of a light source is compared to that of a theoretical black body heated to between 2000 K and 10,000 K, which in the visible light field would have an emission spectrum similar to the color in question.

The apparent color of a light source varies from the orangey red of a candle flame, 1850 K, to bluish in the case of an electronic flash, between 5000 and 6500 K depending on the manufacturer, although some of these temperatures bear no relation to the temperature of the black body. The color variation of the light on a given day is difficult to reproduce with artificial light, and often can only be done with complex and costly devices. This puts the notion of the normality of natural light into perspective.

In order to evaluate the appearance and quality of light, it is appropriate to associate the color temperature with a color rendering index. Among the known indices are, for example, the sun at the horizon 2000K, a sodium lamp 2200 K, incandescent lamps from 2400 K to 2700 K, hot white fluorescent lamps from 2700 K to 3000 K, metal halogen lamps from 3000 K to 4200 K, halogen lamps from 3000 K to 3200 K, neutral white fluorescent lamps from 3900 K TO 4200 K, the sun at its zenith 5800 K, daylight fluorescent lamps from 5400 K to 6100 K, and standard natural light 5000 K, known as D50, or 6500 K, known as D65.

The reason why the blue naturally focuses in front of the red stems from the fact that for a simple lens, the focal length is inversely proportional to the refractive index of the material used for this lens and that, moreover, the refractive index decreases as the wavelength increases. Consequently, if we take two wavelengths such as $\lambda^1 > \lambda^2$, the focal lengths for these two wavelengths will be such that $f_{\lambda_1} > f_{\lambda_2}$. This amounts to saying that the higher the wavelength, the further from the lens the rays will focus.

However, this natural behavior is not favorable to optical performance in the case of a lens in which the longitudinal chromatism is not corrected because of the conditions in which it is used.

For example, for a camera, the normal use is to take photographs at long distances (typically more than 10 m) outdoors and photographs up close indoors. Yet the exterior, i.e. outdoor, illuminant is close to D65, which is mostly blue (short wavelengths), and the interior illuminant is mostly type A, from a tungsten source equivalent to a black body at 2856 K according to the CIE standard. This source is mostly red. This is unfavorable given that blue is normally sharper up close than at infinity.

The object of the present invention is to increase the image quality of an optical system in which the longitudinal chromatism is not pre-corrected for normal use conditions. This problem of increasing it is solved using the principle of inverting the chromatism of this optical system comprising an uncorrected longitudinal chromatism. By acting in this way, good image quality is obtained under normal use conditions. What is meant by normal use conditions is shots taken at infinity or at far distances outdoors with exterior light, of type D65 for example, and shots taken up close indoors, with interior light, of type A for example.

The depth of field relative to the original system is thus extended taking into account the use conditions because the image spot will be smaller up close and at infinity.

The inversion of the chromatism according to the invention takes place in the optical field, preferably, but not necessarily, without optically correcting this chromatism. Thus, it is possible to then correct the sharpness of the acquired image via a digital processing of the image signal resulting from its detection. This processing, of the type described in the document FR-A-2 880 958, uses the remaining chromatic aberration. However, with the invention it is just as possible to simply invert the chromatism, or to invert the chromatism, partially correct the chromatic aberration in the field of the optical system and correct the image signal once detected using electronic image processing, or a combination of these various techniques.

In producing the inversion of the chromatism, it is possible to do so using refractive or diffractive means, or by using the two together. In practice, a chromatism inverting object is interposed between the object to be imaged and an image capturing device.

A diffractive object makes it easier to produce the inversion of the chromatism because it has a negative longitudinal chromatism. Rays composed of long wavelengths focus in front of rays composed of shorter wavelengths.

Thus, the subject of the invention is an optical hardware system equipped with a device for increasing its depth of field for normal use conditions, i.e. for shots taken at infinity or at far distances outdoors with exterior light, of type D65 for example, and for shots taken up close indoors, with interior light, of type A for example, which processes incoherent light,
this incoherent light being divided into at least two spectral bands, a first band for the long wavelengths and a second band for the short wavelengths,
a center wavelength value of the first band being higher than a center wavelength value of the second band,
which has an optical transfer function,
which has a lens for focusing the incoherent light received from an object onto an image plane,
which has storage means for storing a representation of the light images due to these spectral bands that are received in the image plane,
characterized in that it comprises
an optical element interposed between the object and the image plane,
this optical element having a longitudinal chromatic inversion function such that the focal length for the blue is greater than the focal length for the red,
this inversion function having the effect of modifying the optical transfer function of the system in such a way that for an object placed in a first distance range relative to the lens, and for exterior light,
this value of the transfer function is higher in both frequency bands than if this optical element were not interposed.

Preferably, as an improvement, this system includes processing means connected to the storage means for restoring the representation of the light image received in the image plane, which filter the image so as to give a frequency band a sharpness measured in another frequency band.

As an improvement, this inversion function has the effect of modifying the optical transfer function of the system in such a way that for an object placed in a second distance range relative to the lens and for interior light, this value of the transfer function is higher in both frequency bands than if this optical element were not interposed.

In one example, the image sensor is a sensor capable of measuring and differentiating light signals produced in two different color bands, one corresponding to type A light, the other to type D65 light.

BRIEF DESCRIPTION OF THE DRAWINGS

The invention will be better understood by reading the following description and examining the figures that accompany it. The latter are presented only as examples and are not in any way limiting of the invention. The figures show:

FIGS. 1a and 1b: already partly discussed, schematic diagrams that make it possible to understand the invention; FIG. 1b: at the top, for the case of an object at infinity and at the bottom, for an object at a finite distance;

DETAILED DESCRIPTION OF THE EMBODIMENTS

To illustrate the present invention, a simple optical system is considered here. FIG. 1b thus shows an inverting object 1 or 2, interposed between the object O to be imaged and an image plane 3. It would be conceivable to have two inverting objects 1 and 2. Preferably, a lens 4 forming the entry side of the optical system being fixed to a housing of this system, the inverting object is placed downstream, in the object position 2, between the plane 3 and the lens 4. An image sensor 5 of the optical system is placed in the location of the plane 3. The sensor 5, and more generally the storage means, can comprise a charge transfer device 5, a film, or a video camera. The sensor 5 is connected to a processing device comprising, as represented schematically, an interface 6 connected by an address, data and control bus 7 to a microprocessor 8, to a data memory 9, and to a program memory 10. A program stored in the memory 9 can include a digital processing filter.

Figure 3:
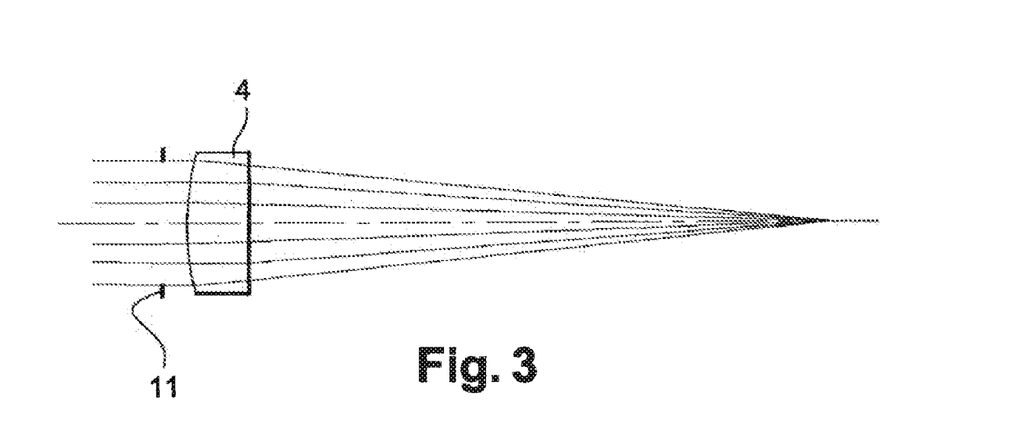
FIG. 3: a spherical lens, for example made of NBK7 from Schott, with a front aperture.

This optical system, FIG. 3, is essentially composed of an aperture 11, in one example having a diameter of 8.1 mm, and a lens 4, in this example made of NBK7 glass from Schott, with a thickness of 4 mm and a diameter of 10 mm. The distance, in this example, between the aperture and the lens is 1.72 mm. In this example, the radius of curvature of the front surface of the lens is 23.58 mm and the radius of curvature of the rear surface of the lens is −157.82 mm. The optical transfer function of this system is linked to the image spot introduced previously by performing a Fourier transform of this image spot, considering only the modulus.

Figure 4:
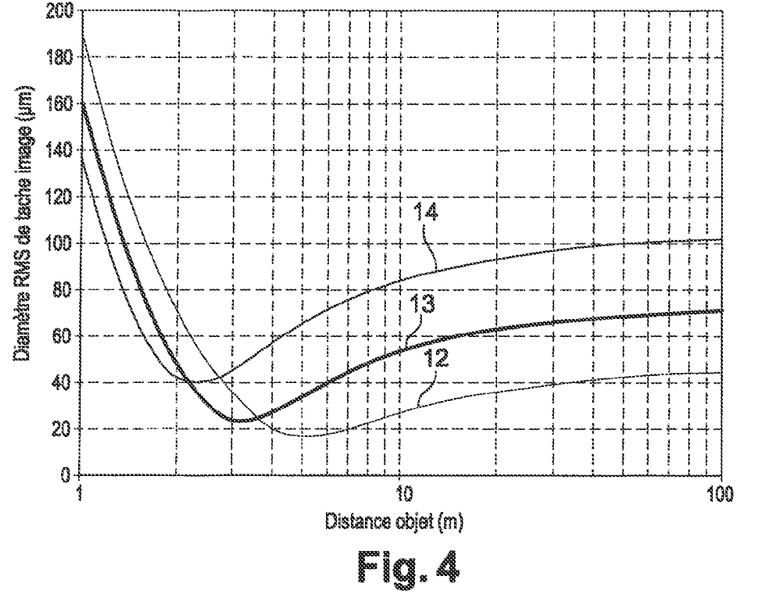
FIG. 4: a representation of the variance of the image spot as a function of the position of the object relative to the optical system, given an illuminant A (Tungsten) for the optical system represented in FIG. 3.

When this lens is used with an illuminant A (Tungsten), the variance of the image spot as a function of the object distance varies as shown in FIG. 4. In this FIG. 4, the curve 12 with the highest ordinate at the origin represents the red spectral component. The curve 13 with the intermediate ordinate at the origin represents the green spectral component. The curve 14 with the lowest ordinate at the origin represents the blue spectral component. The corresponding evolution of the MTF is shown in FIG. 5 by the curves 15 through 17, respectively.

Figure 6:
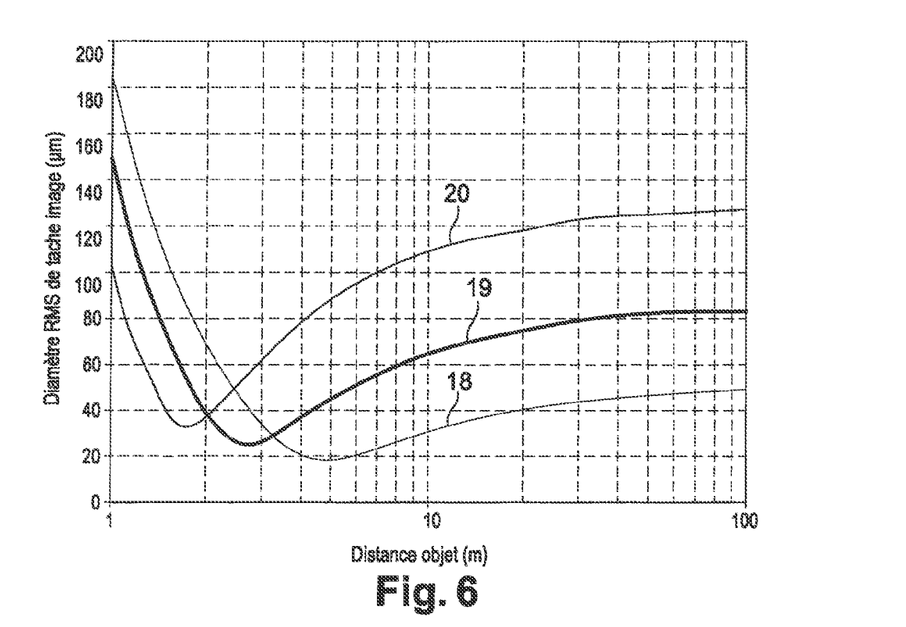
FIG. 6: a representation of the variance of the image spot as a function of the position of the object, given an illuminant D65 for the optical system represented in FIG. 3.
Figure 7:
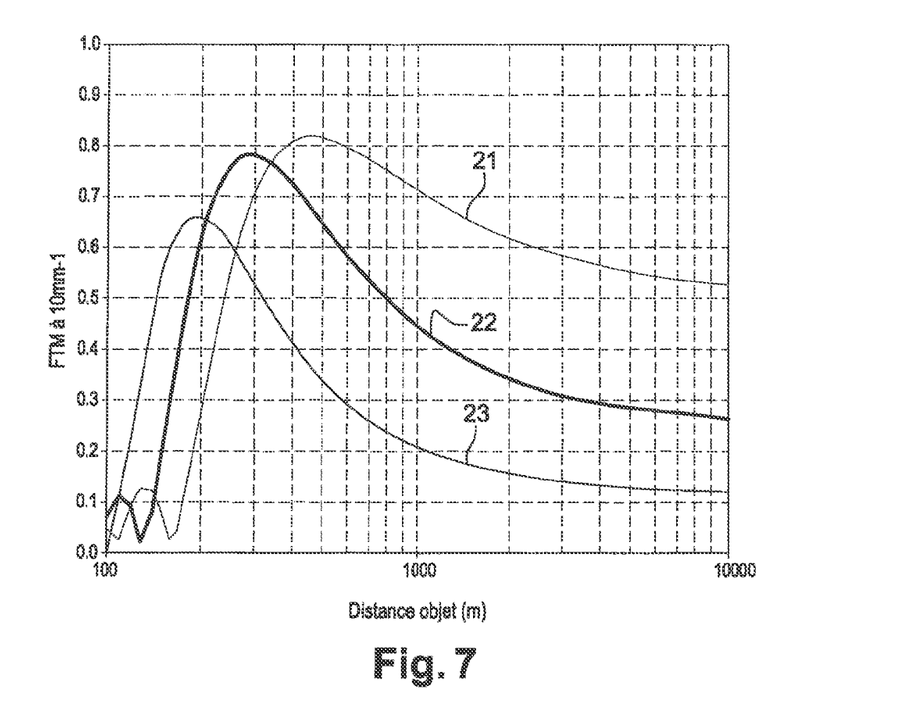
FIG. 7: a representation of the MTF as a function of the position of the object, given an illuminant D65 for the optical system represented in FIG. 3.

When the illuminant is D65, the evolution of the variance of the image spot and the MTF as a function of the object distance are modified, as respectively shown by the curves 18 through 20 and 21 through 23, again in the order red-green-blue, in FIGS. 6 and 7.

Figure 5:
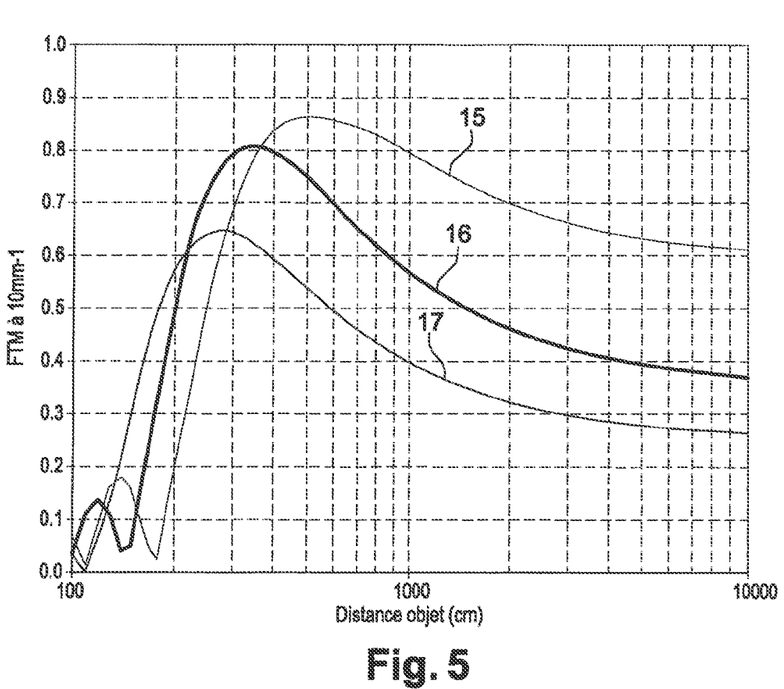
FIG. 5: a representation of the modulation transfer function MTF of the optical system as a function of the position of the object relative to the optical system, given an illuminant A (Tungsten) for the optical system represented in FIG. 3.

The consequence of changing from an illuminant A, FIGS. 4 and 5 to an illuminant D65, FIGS. 6 and 7, is having a better image quality in the near zone. Typically in the curves, for distances of less than 2 m, the spot diameter is smaller and the MTF is higher. On the other hand, this change results in a lower quality, a larger spot diameter and a lower MTF near infinity, typically over 5 m. This may be seen quantitatively in Table 1 below, drawn from FIGS. 4 through 7, where the image quality is better at 2 meters and not as good at 100 meters when changing from an illuminant A to an illuminant D65

TABLE 1

Values of the image spot variance and the MTFs at 2 m and at 100 m for red and blue, in A and in D65.

| | | Object at 2 m | | Object at 100 m | |
|---|---|---|---|---|---|
| | | Blue | Red | Blue | Red |
| A | Variance of the image spot (μm) | 42 | 72 | 102 | 44 |
| | MTF at 10 lp/mm | 0.56 | 0.18 | 0.27 | 0.61 |
| D65 | Variance of the image spot (μm) | 36 | 68 | 128 | 48 |
| | MTF at 10 lp/mm | 0.66 | 0.27 | 0.12 | 0.53 |

The advantage of the present invention is that it has the opposite effect thanks to an inversion of the chromatism of the optical system. This effect is produced when the light changes. Typically, the proposed change amounts to changing from a light A, corresponding to interior light, to a light D65, corresponding to the light resulting from daylight.

Figure 8:
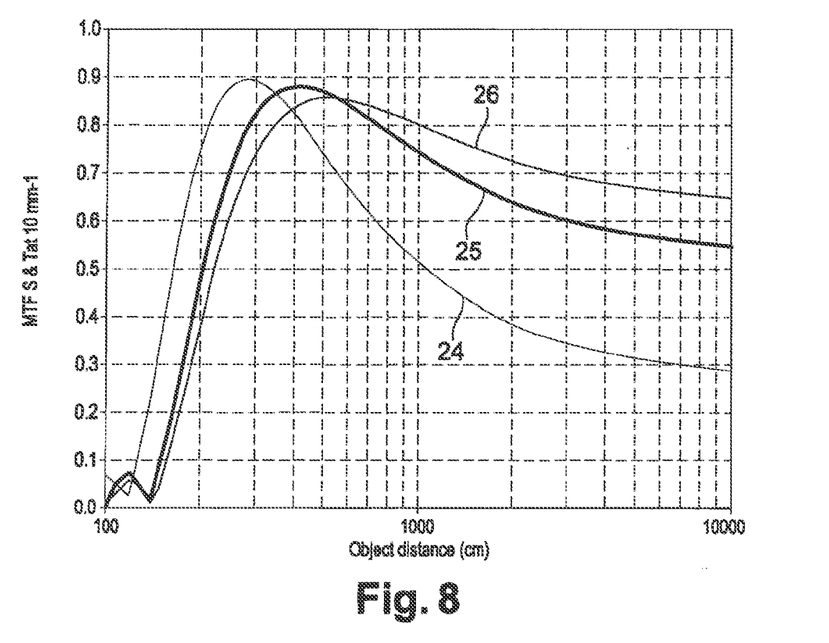
FIGS. 8 and 9: representations equivalent to FIGS. 5 and 7 with the interposition of a diffractive chromatism inverting object according to the invention.
Figure 9:
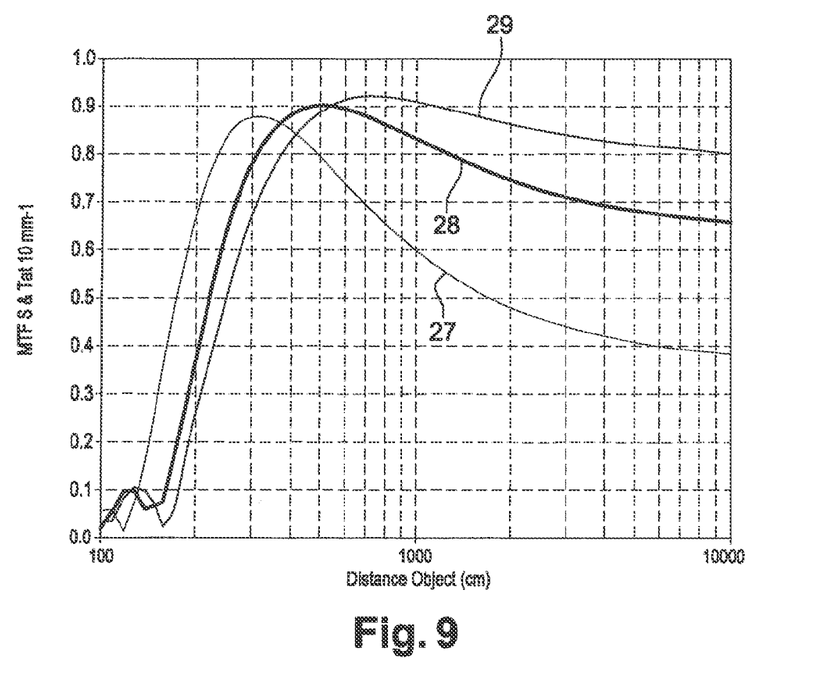

FIGS. 8 and 9 show, by comparison, an example with a diffractive object 1 interposed in front of the lens 4 at the level of the aperture. The expected chromatism inversion effect has clearly been obtained. The red is sharper than the blue up close and the blue is sharper than the red for far distances.

This diffractive object 1 was calculated by placing a flat and parallel plate whose front surface is diffractive at the level of the aperture. This diffractive surface is calculated by means of ray tracing software such as Code V, produced by the company Optical Research Associates in the United States of America, Zemax, produced by the company ZEMAX Development Corporation in the United States of America, OSLO, free software available on the internet by Interstar.net, or the like, while optimizing it by setting as a constraint a blue focal length that is greater than the red focal length. This method, which consists of optimizing a surface by means of ray tracking software while setting particular constraints is well known to the person skilled in the art.

In another exemplary embodiment, it is conceivable to place the diffractive object in a different plane than the aperture.

In the context in which a processing of the type described in the document FR-A-2 880 958 is used to increase the depth of field, it is possible to set a predetermined distance between the red and blue focal lengths in order to obtain a known and controlled chromatism.

Figure 10:
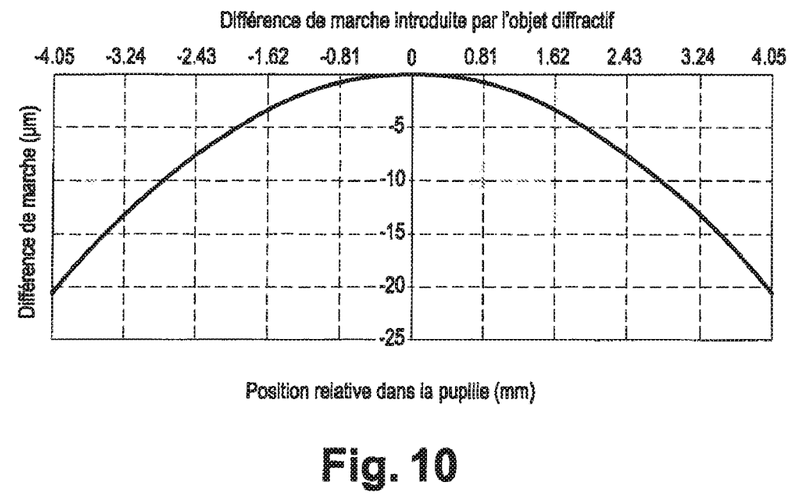
FIG. 10: a path difference introduced by an inverting object.

The diffractive object 1 introduces a path difference, as illustrated in FIG. 10.

Figure 11:
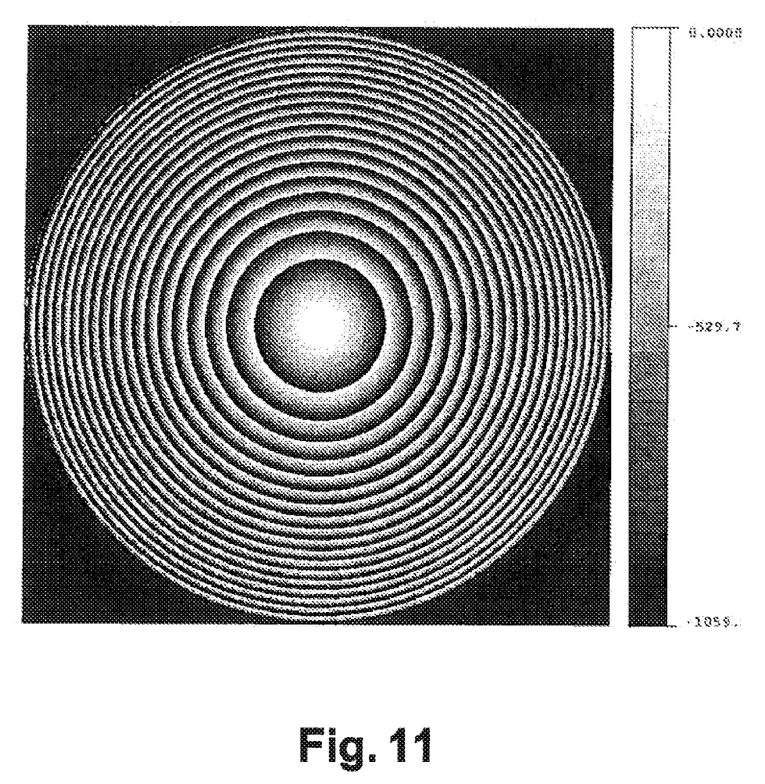
FIGS. 11 and 12: front and slice views of an exemplary embodiment of a diffractive inverting object.
Figure 12:
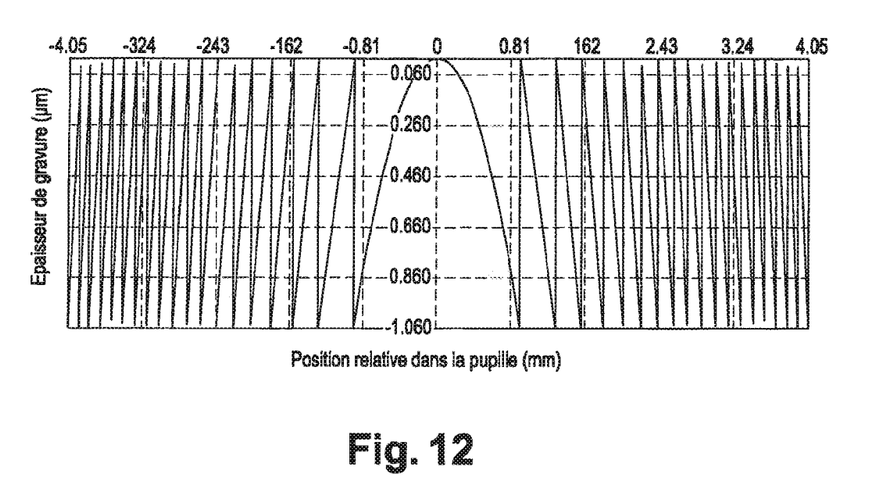

This object 1 can be embodied in the form of a diffraction grating of variable pitch, as represented in a front view in FIG. 11 and in a diametrical slice in FIG. 12. This FIG. 12 corresponds to a blazed grating, which means that the diffraction efficiency will be 100% for the order of diffraction for which the diffractive object has been blazed. Furthermore, it is well known that in producing such an optical element, it is possible to produce it with greater or lesser precision, which will adjust the diffraction efficiency. The greater the number of levels used to produce this element, the closer the object will be to a blazed grating and the closer the efficiency will be to 100%. A blazed grating is an echelette grating.

Changing from a light A, FIG. 8 to a light D65, FIG. 9, improves the image quality at infinity, in both color ranges, and diminishes it in the near zone. This inversion is due to the specific diffractive properties of the object 1 (or 2). Likewise, changing from a light D65, FIG. 9, to a light A, FIG. 8, improves the image quality in the near zone, in both color ranges, and diminishes it at infinity.

This may be seen quantitatively in Table 2, where the image quality is better, in both color ranges, at 100 meters and not as good at 2 meters when changing from an illuminant A to an illuminant D65. In fact, the MTFs in the blue and in the red now respectively change from 0.37 to 0.22 and from 0.75 to 0.66 in the near zone and from 0.65 to 0.80 and from 0.29 to 0.38 in the far zone. And vice versa, it becomes better in the near zone when changing from an exterior light D65 to an interior light A:

TABLE 2

Values of the MTFs at 2 m and 100 m for red and blue in A and D65.

| | | Object at 2 m | | Object at 100 m | |
|---|---|---|---|---|---|
| | | Blue | Red | Blue | Red |
| A | MTF at 10 lp/mm | 0.37 | 0.75 | 0.65 | 0.29 |
| D65 | MTF at 10 lp/mm | 0.22 | 0.66 | 0.80 | 0.38 |

In practice, the optical element 1 or 2 is preferably placed in the location of a main plane of the optical system, between the object and the storage means. Otherwise, this optical element is placed in the location of an image plane of a main plane of the optical system, between the object and the storage means.

Otherwise, the diffractive object can be placed directly on the lens 4. This is what the person skilled in the art commonly calls a hybrid lens, because it is both refractive and diffractive.

The present invention can be extended to the case where the inverting object 1 or 2 and the lens 4 are jointly optimized.

In addition, the storage means comprise a charge transfer device, a film, or a video camera. Lastly, the post-processing means include a digital filter used by the microprocessor 8 by means of a piece of software contained in the memory 9.

Figure 13:
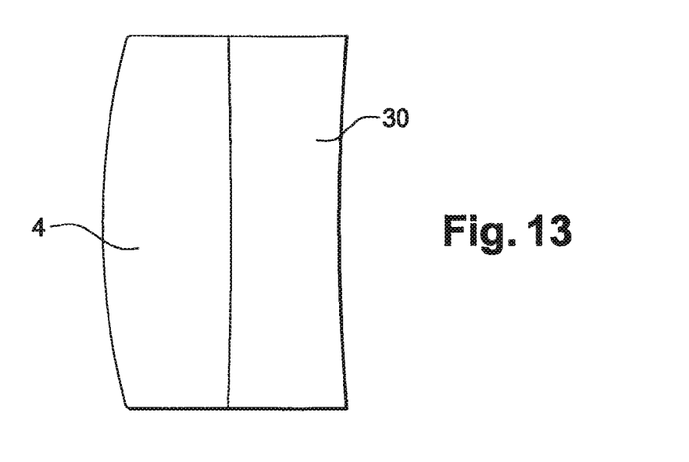
FIG. 13: an exemplary refractive inverting object according to the invention.
Figure 14:
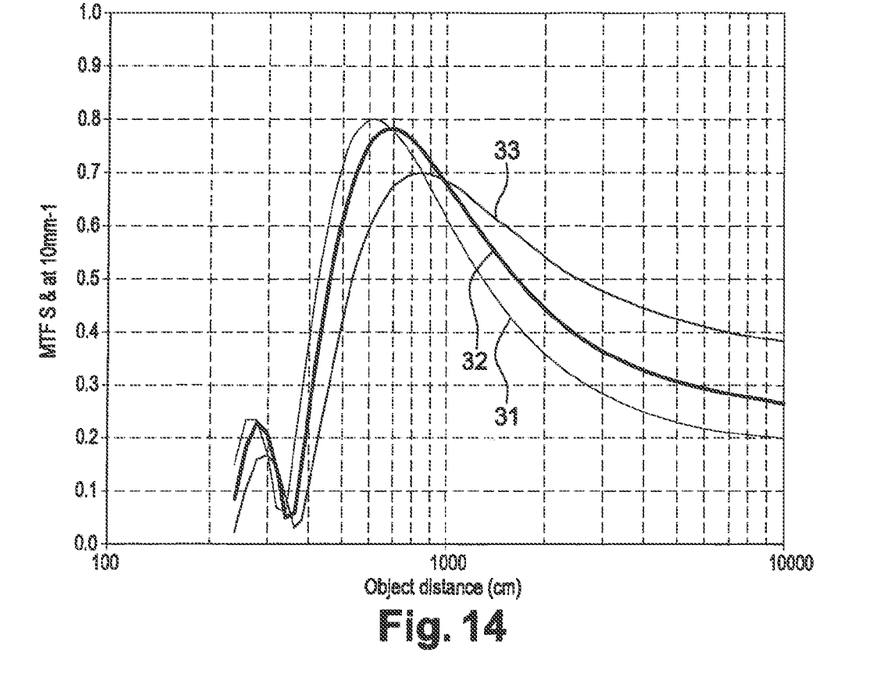
FIGS. 14 and 15: representations equivalent to FIGS. 5 and 7 with the interposition of a refractive chromatism inverting object according to the invention.
Figure 15:
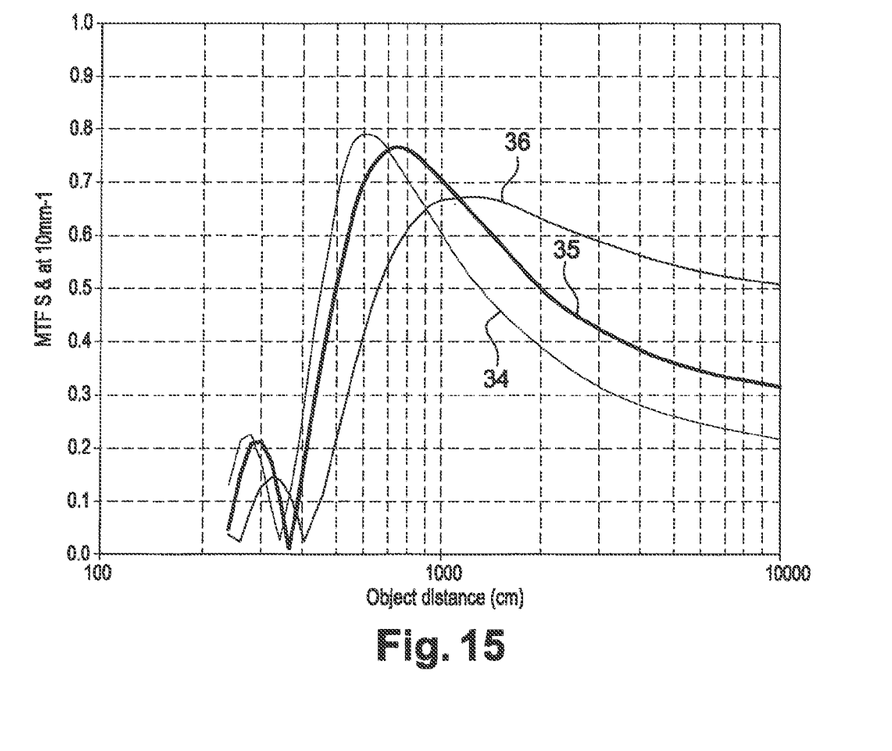

The next FIGS. 13 through 15 show an example with a refractive object interposed behind the lens 4 so as to form a doublet. This doublet is formed, FIG. 13, by the above main lens 4 and by a lens 30 with a diameter of 10 mm whose front surface has a radius of curvature of −157.82 mm, identical to the rear surface of the lens 4, and a radius of curvature for the front surface of 78.88 mm. This lens 30 is for example made of SF4 glass from Schott. The expected chromatism inversion effect has clearly been obtained. The red is sharper than the blue up close and the blue is sharper than the red for the far distances.

This lens 30 was obtained using the same technique used in the context of the diffractive object, i.e., using ray tracing software such as Code V, Zemax, OSLO, etc., to optimize the radius of curvature of the front surface of the lens 30 so that the focal length for the blue in the full system is greater than the focal length of the red. The radius of curvature of the front surface of the lens 30 does not need to be calculated since, in this example, a doublet is present, and consequently this radius of curvature corresponds in absolute value to that of the rear surface of the lens 4.

With this doublet 4, 30, changing from a light A, FIG. 14, to a light D65, FIG. 15, improves the image quality at infinity, in both color ranges, and diminishes it in the near zone. The respective curves 31 through 33 and 34 through 36 of the red, green and blue spectral components show that changing from a light D65 to a light A improves the image quality in the near zone, in both color ranges and diminishes it at infinity.

This may be seen quantitatively in Table 3 below, in which the image quality is better, in both color ranges, at 100 meters and not as good at 4 meters when changing from an illuminant A to an illuminant D65. In fact, the MTFs in the blue and in the red now respectively change from 0.12 to 0.03 and from 0.41 to 0.36 in the near zone and from 0.39 to 0.51 and from 0.20 to 0.23 in the far zone. And vice versa, it becomes better in the near zone when changing from an exterior light D65 to an interior light A.

TABLE 3

Values of the MTFs at 4 m and 100 m for red and blue in A and D65 in the case of the doublet.

|     |               | Object at 4 m | | Object at 100 m | |
| --- | ------------- | ----- | ---- | ---- | ---- |
|     |               | Blue  | Red  | Blue | Red  |
| A   | MTF at 10 lp/mm | 0.12 | 0.41 | 0.39 | 0.20 |
| D65 | MTF at 10 lp/mm | 0.03 | 0.36 | 0.51 | 0.23 |

The MTFs obtained with this doublet 4, 30 are mostly low, but this doublet represents a simple case for the purpose of illustrating the principle of the present invention. This principle may be extended by using several refractive lenses made of glass, plastic or any other light-refractive material. These lenses can be separated from each other, in a series, by air spaces.

The present invention can also be extended to the case of the diffractive and refractive inverting objects commonly known to the person skilled in the art as hybrid lenses.

These inverting objects can be obtained by the person skilled in the art as explained above by means of ray-tracing software.

The invention claimed is:

1. An optical system processing incoherent light divided into at least two spectral bands, a first spectral band for long wavelengths and a second spectral band for short wavelengths, a center wavelength value of the first spectral band being higher than a center wavelength value of the second spectral band, comprising:

an optical transfer function;

a lens to focus the incoherent light received from an object onto an image plane;

a storage device to store a representation of the light images due to said at least two spectral bands received in the image plane; and a device to increase a depth of field of the optical system adapted for shots taken outdoors with an exterior light and shots taken indoors with an interior light, the device comprising an optical element interposed between the object and the image plane, the optical element having a longitudinal chromatic inversion function such that a focal length for a blue light is greater than a focal length for a red light; and wherein the inversion function has the effect of modifying the optical transfer function of the optical system such that the optical transfer function value is higher in both frequency bands with the optical element than without the optical element for an object placed in a first distance range relative to the lens and for exterior light.

2. The optical system of claim 1, wherein the device is adapted for shots taken at distances greater than 10 meters outdoors with the exterior light and wherein said device is adapted for shots taken up close indoors with the interior light.

3. The optical system of claim 1, wherein the device is adapted for increasing the depth of field for conditions corresponding to shots taken outdoors with type D65 light or shots taken indoors with type A light.

4. The optical system of claim 1, further comprising a processor connected to storage device for restoring the representation of the light image received in the image plane, said processor filters the image to provide a sharpness to a spectral band as measured in another spectral band.

5. The optical system of claim 1, wherein the optical transfer function value is higher in both spectral bands with the optical element than without the optical element for an object placed in a second distance range relative to the lens and for interior light.

6. The optical system of claim 1, wherein the optical element is a diffractive, refractive or hybrid mask.

7. The optical system of claim 1, wherein the optical element is placed in a location of a main plane of the optical system, between the object and the storage device.

8. The optical system of claim 1, wherein the optical element is formed of a doublet with the lens, or by several refractive lenses; and wherein said optical element is made of glass, plastic or a light-refractive material.

9. The optical system of claim 1, wherein the optical element is placed in a location of an image plane of a main plane of the optical system, between the object and the storage means.

10. The optical system of claim 1, wherein the storage device comprises a charge transfer device, a film, or a video camera.

11. The optical system of claim 4, wherein the processor comprises a digital filter.

12. The optical system of claim 1, wherein a focal length for short wavelengths in the optical system is greater than a focal length for long wavelengths.

13. A method for increasing the depth of field of an optical system for shots taken outdoors with an exterior lighting and shots taken indoors with an interior lighting, comprising the steps of:

processing incoherent light divided into at least two spectral bands by the optical system, a first spectral band for long wavelengths and a second spectral band for short wavelengths, a center wavelength value of the first spectral band being higher than a center wavelength value of the second spectral band, the optical system comprising an optical transfer function, a lens to focus the incoherent light received from an object onto an image plane, and a storage device to store a representation of the light images due to said at least two spectral bands received in the image plane;

interposing an optical element between the object and the image plane, the optical element comprising a longitudinal chromatic inversion function such that a focal length for a blue light is greater than a focal length for a red light, the inversion function having the effect of modifying the optical transfer function of the optical system such that the optical transfer function value is higher in both frequency bands with the optical element than without the optical element for an object placed in a first distance range relative to the lens and for exterior light.

* * * * *